(12) United States Patent
Tsuchida et al.

(10) Patent No.: US 10,719,458 B2
(45) Date of Patent: Jul. 21, 2020

(54) DATA TRANSFER DEVICE, IMAGE PROCESSING DEVICE, AND IMAGING DEVICE

(71) Applicant: OLYMPUS CORPORATION, Hachioji-shi, Tokyo (JP)

(72) Inventors: Ryusuke Tsuchida, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/167,762

(22) Filed: Oct. 23, 2018

(65) Prior Publication Data
US 2019/0057053 A1    Feb. 21, 2019

Related U.S. Application Data

(63) Continuation of application No. PCT/JP2016/066764, filed on Jun. 6, 2016.

(51) Int. Cl.
*G06F 13/16*    (2006.01)
*G06F 13/28*    (2006.01)
(Continued)

(52) U.S. Cl.
CPC .......... *G06F 13/1673* (2013.01); *G06F 3/147* (2013.01); *G06F 13/28* (2013.01);
(Continued)

(58) Field of Classification Search
None
See application file for complete search history.

(56) References Cited

U.S. PATENT DOCUMENTS 5,175,821 A * 12/1992 Dutcher .................. G06F 13/18
358/1.11
6,611,537 B1 * 8/2003 Edens ................. H04L 12/2803
348/E7.05
(Continued)

FOREIGN PATENT DOCUMENTS

JP    55-129822 A    10/1980
JP    62-226258 A    10/1987
(Continued)

OTHER PUBLICATIONS

International Search Report dated Jul. 19, 2016, issued in counterpart International Application No. PCT/JP2016/066764, with English Translation. (4 pages).

*Primary Examiner* — Henry Tsai
*Assistant Examiner* — Christopher A Bartels
(74) *Attorney, Agent, or Firm* — Westerman, Hattori, Daniels & Adrian, LLP

(57) ABSTRACT

A direct memory access (DMA) buffer section configured to store data in a plurality of storage regions in units of DMA transfers, a buffer control section configured to output a first writing permission signal for permitting the DMA transfer on the basis of presence or absence of a free storage region, a smoothing buffer control section configured to output a second writing permission signal for permitting the DMA transfer within a predetermined period, a buffer writing control section configured to execute the DMA transfer according to the first writing permission signal and the DMA transfer according to the second writing permission signal and stored the data to the free storage region, and a buffer reading control section configured to sequentially read the data for each storage region, wherein a predetermined amount of data sequentially acquired by a plurality of DMA transfers is output as a transfer unit.

9 Claims, 4 Drawing Sheets

(51) Int. Cl.
    *G09G 5/395* (2006.01)
    *G09G 5/00* (2006.01)
    *G09G 5/393* (2006.01)
    *G06F 3/147* (2006.01)
    *G06T 1/60* (2006.01)

(52) U.S. Cl.
    CPC .............. *G06T 1/60* (2013.01); *G09G 5/003* (2013.01); *G09G 5/393* (2013.01); *G09G 5/395* (2013.01); *G09G 2360/127* (2013.01)

(56) References Cited

U.S. PATENT DOCUMENTS

| | | | | |
|---|---|---|---|---|
| 9,465,680 | B1* | 10/2016 | Chynoweth | G06F 11/3409 |
| 2004/0187122 | A1* | 9/2004 | Gosalia | G06F 9/4843 |
| | | | | 718/100 |
| 2007/0083491 | A1* | 4/2007 | Walmsley | G06F 21/608 |
| 2007/0121596 | A1* | 5/2007 | Kurapati | H04L 29/06027 |
| | | | | 370/356 |
| 2008/0222663 | A1* | 9/2008 | Carpenter | G06F 12/145 |
| | | | | 719/328 |
| 2008/0263307 | A1 | 10/2008 | Adachi | |
| 2012/0085810 | A1* | 4/2012 | Lee | B23K 3/0623 |
| | | | | 228/41 |
| 2014/0189427 | A1* | 7/2014 | Jayaprakash Bharadwaj | G06F 11/1415 |
| | | | | 714/15 |
| 2014/0269306 | A1* | 9/2014 | Alsup | H04L 47/13 |
| | | | | 370/235 |
| 2016/0020897 | A1* | 1/2016 | Kurts | H04L 43/50 |
| | | | | 370/503 |
| 2017/0060579 | A1* | 3/2017 | Vincent | G06F 9/3836 |
| 2019/0079573 | A1* | 3/2019 | Hanson | G11C 5/147 |
| 2019/0129777 | A1* | 5/2019 | Rangarajan | G06F 11/1048 |

FOREIGN PATENT DOCUMENTS

| | | |
|---|---|---|
| JP | 2003-85125 A | 3/2003 |
| JP | 2006-39672 A | 2/2006 |
| JP | 2008-269282 A | 11/2008 |

* cited by examiner

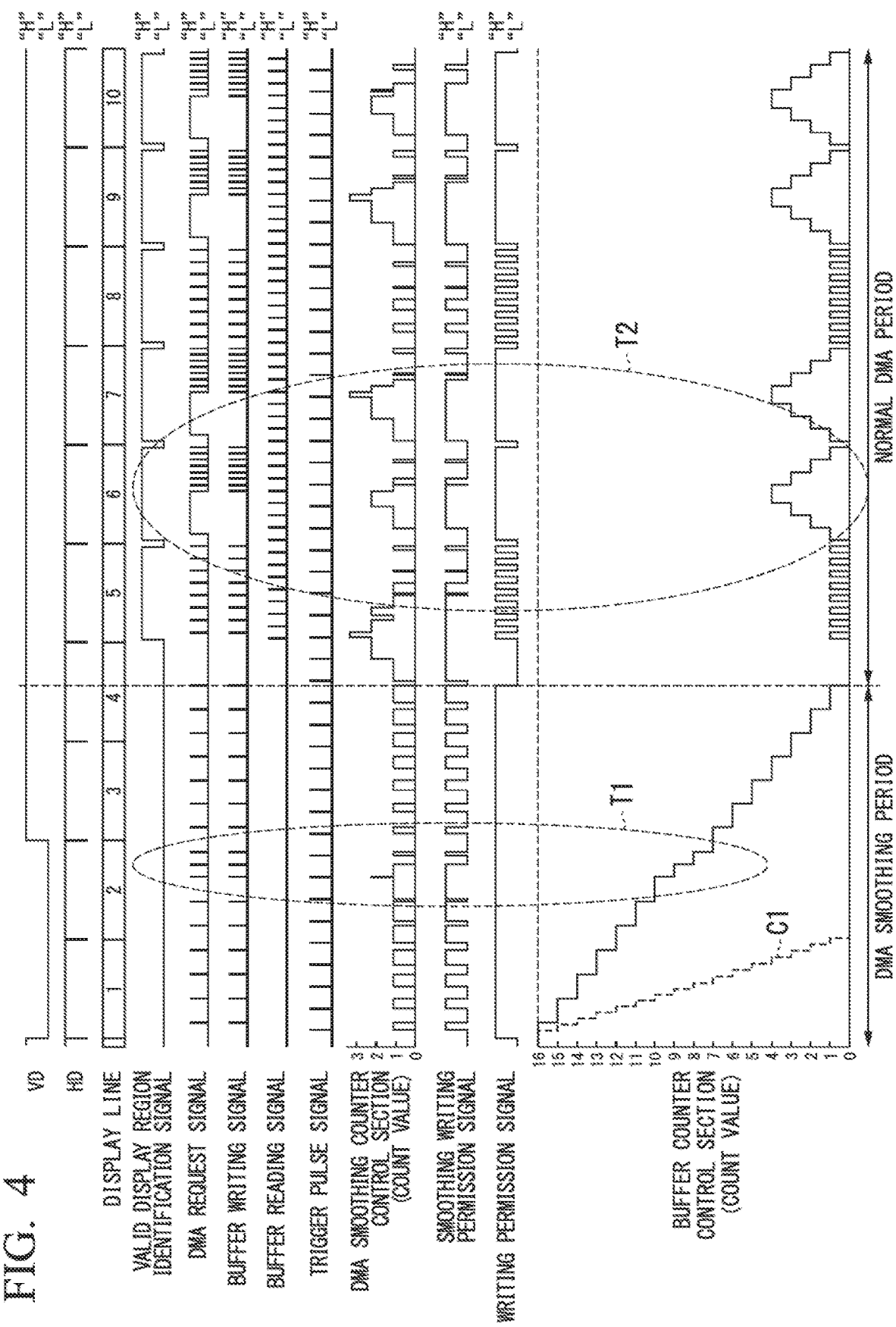

DATA TRANSFER DEVICE, IMAGE PROCESSING DEVICE, AND IMAGING DEVICE

TECHNICAL FIELD

The present invention relates to a data transfer device, an image processing device, and an imaging device.

This application is a continuation application based on PCT Patent Application No. PCT/JP 2016/066764, filed Jun. 6, 2016.

BACKGROUND ART

In an imaging device such as a still-image camera or a moving-image camera, various image processing is performed by an image processing device such as a mounted system LSI. In many image processing devices mounted on an imaging device, a plurality of functional blocks configured to perform image processing are provided and are connected to an internal data bus. Also, in the image processing device, for example, a dynamic random access memory (DRAM) which is a storage device configured to temporarily store image data to be subjected to image processing is connected. The DRAM is connected to a data bus inside the image processing device and shared by functional blocks connected to the data bus. In such an image processing device, each functional block operates as a data transfer device configured to perform the transfer of image data to and from the DRAM, i.e., the reading of image data to be subjected to image processing from the DRAM or the writing of image data to the DRAM after the image processing according to a direct memory access (DMA) transfer via the data bus.

In the image processing device, a bus arbiter for arbitrating the DMA transfer of each functional block (a data transfer device) to and from the DRAM is provided. The bus arbiter arbitrates an access request (hereinafter referred to as a "DMA request") based on the DMA transfer output from each functional block and controls access to the DRAM by the functional block receiving the DMA request. To maximize the efficiency of the DMA transfer, the arbitration of the DMA request by the bus arbiter reduces a loss time during which the DRAM cannot accept the access (for example, a bank loss time related to a bank, a reading/writing switching loss time related to switching between the reading of data and the writing of data, or the like) and is performed on the basis of a priority set for each functional block in accordance with a predetermined condition. That is, the bus arbiter arbitrates the DMA request from each functional block to preferentially receive a DMA request from a functional block with a high priority.

Each functional block (a data transfer device) provided in the image processing device is also configured to include a DMA buffer with a predetermined storage capacity in consideration of a case in which an output DMA request is not accepted by the bus arbiter. In a functional block having a configuration including the DMA buffer, a predetermined amount of image data to be subjected to image processing is acquired according to the DMA transfer (reading from the DRAM) and pre-stored in the DMA buffer, and image processing is performed while the image data stored in the DMA buffer is read at a timing when necessary thereafter. In the functional block including the DMA buffer, a subsequent DMA request is output in accordance with a free capacity of the DMA buffer. Thereby, in the functional block including the DMA buffer, the image data can be transferred at a desired transfer rate according to the DMA transfer, and the image processing can be completed during a predetermined period.

Meanwhile, in the functional block (the data transfer device) having the configuration including the above-described DMA buffer, there are a period during which the DMA transfer is frequently performed and a period during which the DMA transfer is seldom performed in the process of image processing. This is because the functional block having the configuration including the DMA buffer continues to successively output DMA requests from an initial timing at which the image processing starts until the storage capacity of the DMA buffer is in a full state and outputs the DMA request only when the storage capacity of the DMA buffer is in a free state if the storage capacity of the DMA buffer is in the full state. Here, in the functional block (the data transfer device) including the DMA buffer, a period during which the DMA request continues to be successively output until the storage capacity of the DMA buffer is in the full state is a period during which the DMA transfer is frequently performed and a period during which the DMA request is output only when the storage capacity of the DMA buffer is in the free state is a period during which the DMA transfer is seldom performed.

Thus, in a system including a functional block (a data transfer device) having a configuration including a DMA buffer as described above, a system operation, i.e., an operation of an image processing device or an imaging device equipped with the image processing device, may fail according to a priority preset for arbitrating the DMA request from each functional block. For example, when the priority is set for each functional block, the system operation may fail if a high priority is set for a functional block having a configuration including a DMA buffer in accordance with a period during which the DMA transfer is frequently performed. This is because, if a functional block having a configuration including a DMA buffer for which a high priority is set continues to successively output DMA requests during a period when the DMA transfer is frequently performed, i.e., if the DMA requests are output in a concentrated manner, the DMA request of another functional block with a low priority is not accepted and the functional block with the low priority cannot perform the DMA transfer. In contrast, for example, when the priority is set for a functional block having a configuration including a DMA buffer, if a low priority is set for a functional block of a configuration including a DMA buffer in accordance with a period during which the DMA transfer is seldom performed, i.e., if a high priority is set for another functional block, the DMA transfer cannot be performed during a period in which the functional block of the configuration including the DMA buffer frequently performs the DMA transfer and the system operation may fail as expected.

Therefore, a setting process for sequentially changing the priority in consideration of each of a period during which the DMA transfer is frequently performed and a period during which the DMA transfer is seldom performed in the functional block (the data transfer device) of the configuration including the DMA buffer is conceived. However, the number of functional blocks (data transfer devices) having the DMA buffer is not limited to one in the system, and a process when the priority is set for each functional block becomes more complex as the number of functional blocks with a configuration including the DMA buffer included in the system becomes larger. Also, if the temporarily determined setting of the priority is changed, i.e., if it is necessary to change a condition when the priority is set, the change in the condition can cause a failure of a system operation.

In this manner, in a system including a functional block (a data transfer device) having a configuration including a DMA buffer, even when a DMA request is arbitrated on the basis of a preset priority for each functional block, a system operation may fail according to a setting of a priority for each functional block.

Therefore, for example, as in Japanese Unexamined Patent Application, First Publication No. 2006-039672, technology for alleviating the concentration of DMA requests from a specific functional block (a bus master) has been disclosed. In Japanese Unexamined Patent Application, First Publication No. 2006-039672, a method of controlling the right to use a bus so that a bus master having a high priority does not exclusively occupy the right to use the bus is disclosed. More specifically, in Japanese Unexamined Patent Application, First Publication No. 2006-039672, technology in which an interval predetermined for each DMA request output by the bus master is available so that the DMA transfer in another functional block is not inhibited when a bus master with a high priority successively outputs DMA requests is disclosed. In other words, according to the technology disclosed in Japanese Unexamined Patent Application, First Publication No. 2006-039672, a functional block (a bus master) for which the output DMA request is accepted by the bus arbiter does not output the next DMA request until a predetermined time elapses and therefore DMA requests from functional blocks (bus masters) with the high priority are not concentrated. Thereby, a DMA request output during a period until a predetermined time elapses can also be accepted for a functional block (a bus master) having a low priority.

SUMMARY OF INVENTION

Solution to Problem

According to a first aspect of the present invention, there is provided a data transfer device, including: a DMA buffer section including a plurality of storage regions and configured to store data acquired by a DMA transfer in the storage regions in units of the DMA transfers; a buffer control section configured to output a first writing permission signal for permitting the DMA transfer for acquiring the data on the basis of presence or absence of a free storage region which is one of the storage regions where the data is not stored; a smoothing buffer control section configured to output a second writing permission signal for permitting the DMA transfer for acquiring the data within a predetermined period; a buffer writing control section configured to execute the DMA transfer according to the first writing permission signal and the DMA transfer according to the second writing permission signal, and cause the data acquired by each of the DMA transfer to be sequentially stored in the free storage region; and a buffer reading control section configured to sequentially read the data stored in the storage region for each storage region, wherein a predetermined amount of data sequentially acquired by a plurality of DMA transfers is output as a transfer unit.

According to a second aspect of the present invention, in the data transfer device according to the above-described first aspect, the buffer writing control section may be configured to perform switching between the execution of the DMA transfer according to the first writing permission signal and the execution of the DMA transfer according to the second writing permission signal at predetermined timings for each transfer unit.

According to a third aspect of the present invention, in the data transfer device according to the above-described second aspect, the buffer writing control section may be configured to execute the DMA transfer according to the second writing permission signal until the data is stored in all of the storage regions provided in the DMA buffer section from a reference timing in each transfer unit, and the buffer writing control section may be configured to acquire the data to be stored in the free storage region where reading of the data has been completed by the buffer reading control section by the DMA transfer in accordance with the first writing permission signal after the data is stored in all of the storage regions provided in the DMA buffer section.

According to a fourth aspect of the present invention, in the data transfer device according to the above-described third aspect, the buffer writing control section may start the DMA transfer according to the second writing permission signal from a timing at which a predetermined time has elapsed from the reference timing.

According to a fifth aspect of the present invention, in the data transfer device according to the above-described first aspect, the smoothing buffer control section may include a counter configured to count the number of DMA transfers to be successively performed, the counter may be initialized before the first DMA transfer for each transfer unit, increment a count value at each predetermined time interval, and decrement the count value every time the buffer writing control section executes the DMA transfer, and the smoothing buffer control section may be configured to output the second writing permission signal on the basis of the count value of the counter.

According to a sixth aspect of the present invention, in the data transfer device according to the above-described fifth aspect, the transfer unit may be one frame in an image, the data may be image data for display, and the data transfer device may be configured to output the image data for display acquired according to the DMA transfer to a display device.

According to a seventh aspect of the present invention, there is provided an image processing device, including: a data transfer device which includes a DMA buffer section including a plurality of storage regions and configured to store data acquired by a DMA transfer in the storage regions in units of the DMA transfers; a buffer control section configured to output a first writing permission signal for permitting the DMA transfer for acquiring the data on the basis of presence or absence of a free storage region which is one of the storage regions where the data is not stored; a smoothing buffer control section configured to output a second writing permission signal for permitting the DMA transfer for acquiring the data within a predetermined period; a buffer writing control section configured to execute the DMA transfer according to the first writing permission signal and the DMA transfer according to the second writing permission signal, and cause the data acquired by each of the DMA transfer to be sequentially stored in the free storage region; and a buffer reading control section configured to sequentially read the data stored in the storage region for each storage region, wherein a predetermined amount of data sequentially acquired by a plurality of DMA transfers is output as a transfer unit.

According to an eighth aspect of the present invention, in the image processing device according to the above-described seventh aspect, the transfer unit may be one frame in an image, the data may be image data for display, and the data transfer device may be provided as a display processing section configured to output the image data for display acquired according to the DMA transfer to a display device.

According to a ninth aspect of the present invention, there is provided an imaging device, including: an image processing device which includes a data transfer device including a DMA buffer section including a plurality of storage regions and configured to store data acquired by a DMA transfer in the storage regions in units of the DMA transfers; a buffer control section configured to output a first writing permission signal for permitting the DMA transfer for acquiring the data on the basis of presence or absence of a free storage region which is one of the storage regions where the data is not stored; a smoothing buffer control section configured to output a second writing permission signal for permitting the DMA transfer for acquiring the data within a predetermined period; a buffer writing control section configured to execute the DMA transfer according to the first writing permission signal and the DMA transfer according to the second writing permission signal, and cause the data acquired by each of the DMA transfer to be sequentially stored in the free storage region; and a buffer reading control section configured to sequentially read the data stored in the storage region for each storage region, wherein a predetermined amount of data sequentially acquired by a plurality of DMA transfers is output as a transfer unit.

According to a tenth aspect of the present invention, in the imaging device according to the above-described ninth aspect, the transfer unit may be one frame in an image, the data may be image data for display, and the data transfer device may be provided as a display processing section configured to output the image data for display acquired according to the DMA transfer to a display device.

BRIEF DESCRIPTION OF DRAWINGS

FIG. 4 is a timing chart schematically showing an example of the operation of the data transfer device according to the embodiment of the present invention.

DESCRIPTION OF EMBODIMENTS

Figure 1:
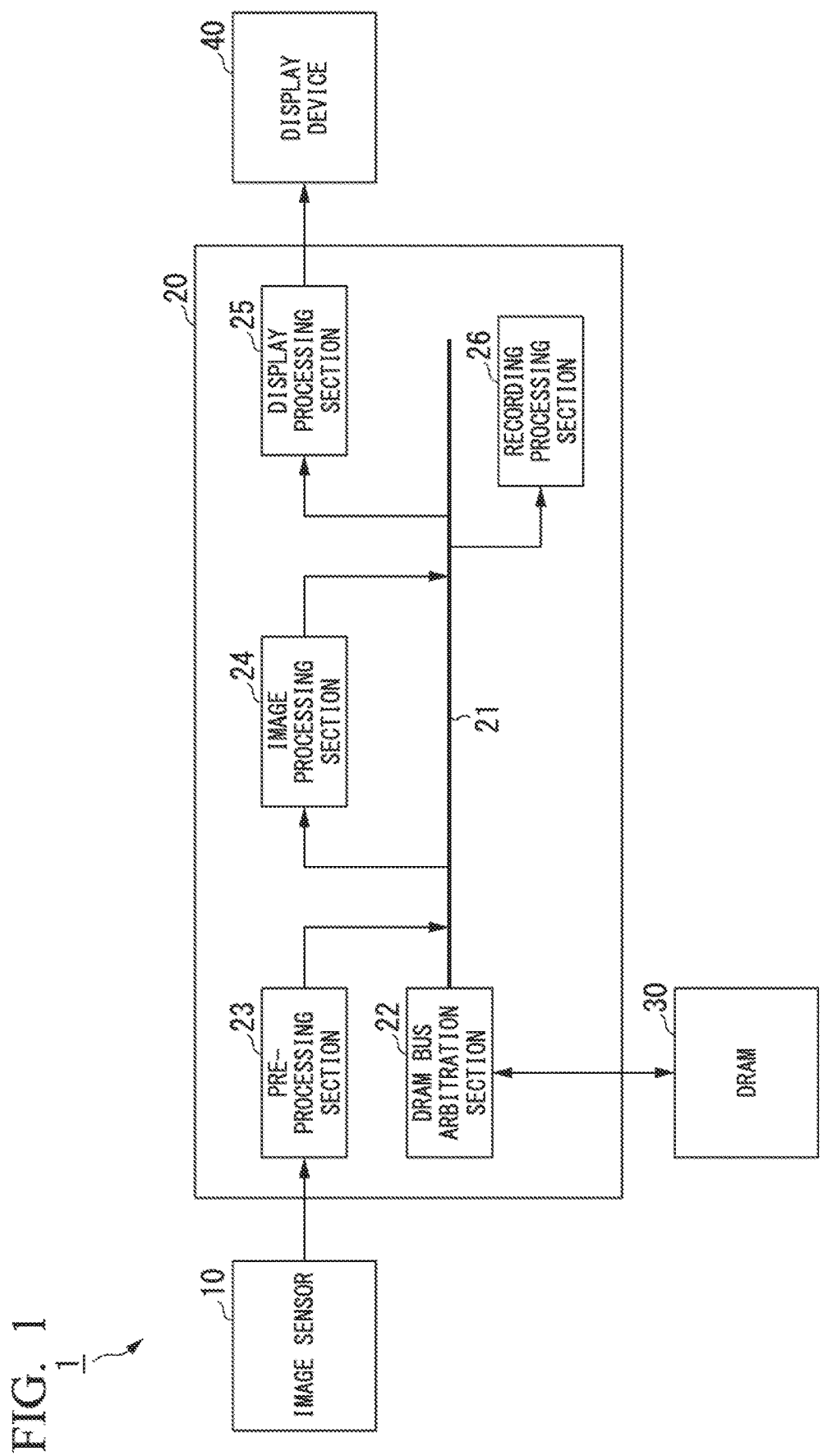
FIG. 1 is a block diagram showing a schematic configuration of an imaging device equipped with an image processing device including a data transfer device according to an embodiment of the present invention.

Hereinafter, embodiments of the present invention will be described with reference to the drawings. Also, in the following description, for example, a case in which an image processing device including a data transfer device according to an embodiment of the present invention is mounted on an imaging device such as a still-image camera will be described. FIG. 1 is a block diagram showing a schematic configuration of the imaging device equipped with the image processing device including the data transfer device according to the embodiment of the present invention.

The imaging device 1 shown in FIG. 1 includes an image sensor 10, an image processing device 20, a dynamic random access memory (DRAM) 30, and a display device 40. Also, the image processing device 20 includes a DRAM bus arbitration section 22, a pre-processing section 23, an image processing section 24, a display processing section 25, and a recording processing section 26. In the image processing device 20, the DRAM bus arbitration section 22, the pre-processing section 23, the image processing section 24, the display processing section 25, and the recording processing section 26 are connected to a DRAM bus 21 which is a common data bus.

The imaging device 1 captures an image of a subject with the image sensor 10. Then, the imaging device 1 performs various arithmetic processes on pixel signals output by the image sensor 10 with the image processing device 20 and generates an image for recording (hereinafter referred to as a "record image") or an image for display (hereinafter referred to as a "display image") according to an image of a subject captured by the image sensor 10 (hereinafter referred to as a "captured image"). Further, the imaging device 1 causes the display device 40 to display the display image generated by the image processing device 20. Also, the imaging device 1 causes the record image generated by the image processing device 20 to be recorded in a recording medium (not shown).

The image sensor 10 is a solid-state imaging device configured to photoelectrically convert an optical image of the subject formed by a lens (not shown) provided in the imaging device 1. For example, the image sensor 10 is a solid-state imaging device represented by a charge coupled device (CCD) image sensor and a complementary metal oxide semiconductor (CMOS) image sensor. The image sensor 10 outputs a pixel signal corresponding to the optical image of the imaged subject to the pre-processing section 23 provided in the image processing device 20.

The display device 40 is a display device configured to display an image corresponding to a display image output from the display processing section 25 provided in the image processing device 20. For example, the display device 40 is a display device such as a thin film transistor (TFT) liquid crystal display (LCD) or an organic electroluminescence (EL) display. Also, the display device 40 may be configured to be attachable to and detachable from the imaging device 1.

The DRAM 30 is a data storage section configured to store various data to be subjected to an arithmetic process in the image processing device 20 provided in the imaging device 1. The DRAM 30 is connected to the DRAM bus 21 via the DRAM bus arbitration section 22 provided in the image processing device 20. The DRAM 30 stores image data of each processing step in the image processing device 20. For example, the DRAM 30 stores pixel data output by the pre-processing section 23 on the basis of the pixel signals output from the image sensor 10. Also, for example, the DRAM 30 stores data of images (a record image and a display image) generated by the image processing section 24 provided in the image processing device 20.

The image processing device 20 performs a predetermined arithmetic process (image processing) on the pixel signals output from the image sensor 10 to generate the record image or the display image. Then, the image processing device 20 causes the display device 40 to display the generated display image. Also, the image processing device 20 caused the generated record image to be recorded in the recording medium (not shown).

The DRAM bus arbitration section 22 is a bus arbiter configured to arbitrate an access request (a DMA request) based on a direct memory access (DMA) transfer from each functional block within the image processing device 20 connected to the DRAM bus 21 to the DRAM 30. More specifically, when the DMA request is input from each functional block, the DRAM bus arbitration section 22 arbitrates the DMA request from each functional block on the basis of the priority set for each functional block and determines a functional block of which the DMA request is accepted. Then, the DRAM bus arbitration section 22 notifies the determined functional block that the DMA request has been accepted.

Also, the DRAM bus arbitration section 22 controls a data transfer between the functional block of which the DMA request has been accepted and the DRAM 30, i.e., a DMA transfer, via the DRAM bus 21. More specifically, in accordance with an access signal from the functional block of which the DMA request has been accepted to the DRAM 30, the DRAM bus arbitration section 22 controls the transfer (writing) of data output by the functional block of which the DMA request has been accepted to the DRAM bus 21 and the output of data transferred (written) to the DRAM 30 and acquired (read) from the DRAM 30 to the functional block of which the DMA request has been accepted.

The pre-processing section 23 is a functional block configured to generate data of an image (imaging data) based on the pixel signal by applying a predetermined arithmetic process to the pixel signal output from the image sensor 10. An arithmetic process to be performed by the pre-processing section 23 on the pixel signal output from the image sensor 10 is so-called pre-processing such as defect correction and shading correction. The pre-processing section 23 causes the DRAM 30 to store (write) image data generated according to the pre-processing (hereinafter referred to as "pre-processed image data") according to the DMA transfer via the DRAM bus 21. That is, the pre-processing section 23 operates as a data transfer device configured to transfer the imaging data generated on the basis of the pixel signal output from the image sensor 10 to the DRAM 30 according to the DMA transfer.

The image processing section 24 is a functional block configured to generate a display image or a record image according to the captured image of the subject photographed by the image sensor 10 by performing a predetermined arithmetic process on the pre-processed image data stored in the DRAM 30. The arithmetic process to be performed on the pre-processed image data by the image processing section 24 includes various types of image processing for display or image processing for recording such as a noise removal process, a YC conversion process, a resizing process, and moving-image compression processes such as a JPEG compression process, an MPEG compression process, and an H.264 compression process. The image processing section 24 acquires (reads) the pre-processed image data stored in the DRAM 30 according to the DMA transfer via the DRAM bus 21 and performs image processing of an image for display and an image for recording on the acquired pre-processed image data. Also, the image processing section 24 causes the DRAM 30 to record (write) data of a display image generated by performing image processing for display on the pre-processed image data (hereinafter referred to as "display image data") in the DRAM 30 according to the DMA transfer via the DRAM bus 21. Also, the image processing section 24 causes the DRAM 30 to record (write) data of a record image generated by performing image processing for recording on the pre-processed image data (hereinafter referred to as "record image data") in the DRAM 30 according to the DMA transfer via the DRAM bus 21. That is, the image processing section 24 operates as a data transfer device configured to transfer the display image data or the record image data generated on the basis of the (pre-processed) image data acquired (read) from the DRAM 30 according to the DMA transfer to the DRAM 30 according to the DMA transfer.

The display processing section 25 is a functional block configured to perform a predetermined arithmetic process on the display image data stored in the DRAM 30. The display processing section 25 outputs the display image data subjected to the arithmetic process to the display device 40. Thereby, an image according to the display image data, i.e., a display image according to the captured image of the subject photographed by the image sensor 10, is displayed on the display device 40. The display processing section 25 acquires (reads) display image data stored in the DRAM 30 according to the DMA transfer via the DRAM bus 21 and performs a predetermined arithmetic process on the acquired display image data. In other words, the display processing section 25 operates as a data transfer device configured to perform the predetermined arithmetic process on the display image data acquired (read) from the DRAM 30 according to the DMA transfer.

The recording processing section 26 is a functional block configured to perform a predetermined arithmetic process on the record image data stored in the DRAM 30. The recording processing section 26 causes the record image data subjected to the arithmetic process to be recorded in the recording medium (not shown). Thereby, the record image data, i.e., data of a record image according to the captured image of the subject photographed by the image sensor 10, is recorded in the recording medium (not shown). As the recording medium in which the recording processing section 26 causes the record image data to be recorded, for example, there are recording mediums with various configurations such as an SD memory card and Compact Flash (CF (registered trademark)). The recording processing section 26 acquires (reads) the record image data stored in the DRAM 30 according to the DMA transfer via the DRAM bus 21 and performs a predetermined arithmetic process on the acquired record image data. That is, the recording processing section 26 operates as a data transfer device configured to perform the predetermined arithmetic process on the record image data (read) acquired from the DRAM 30 according to the DMA transfer.

According to such a configuration, the imaging device 1 generates a display image according to the captured image of the subject photographed by the image sensor 10 in the image processing device 20 having various functional blocks (data transfer devices) and causes the display device 40 to display the generated display image. Also, the imaging device 1 generates a record image according to the captured image of the subject photographed by the image sensor 10 in the image processing device 20 including various functional blocks (the data transfer devices) and causes the generated record image to be recorded in the recording medium (not shown).

Also, the functional blocks (the data transfer devices) provided in the image processing device 20 include a functional block required to complete image processing during a predetermined period and a functional block which is not required to complete image processing during a predetermined period. More specifically, because it is necessary for the pre-processing section 23 to store (write) the pre-processed image data in the DRAM 30 in synchronization with a period during which the pixel signal is output from the image sensor 10, the pre-processing section 23 is a functional block required to complete image processing during a predetermined period. Also, because the display processing section 25 is required to output display image data obtained by performing a predetermined arithmetic process on display image data of each frame acquired (read) from the DRAM 30 (hereinafter referred to as "valid display image data") in synchronization with a timing at which the display device 40 displays a display image, the display processing section 25 is a functional block required to complete the arithmetic process (image processing) during a predetermined period.

Also, because the image processing section 24 is a functional block configured to perform image processing on pre-processed image data of each frame acquired (read) from the DRAM 30, the image processing section 24 is a functional block which is not constrained to completing the image processing during a predetermined period, i.e., which is not required to complete the image processing during a predetermined period. However, if the image processing section 24 causes the display device 40 to sequentially display images according to display image data generated by performing the image processing for display or causes record image data generated by performing the image processing for recording to be sequentially recorded in the recording medium (not shown), the image processing section 24 becomes a functional block required to complete the image processing in synchronization with a predetermined period. For example, if the imaging device 1 causes the display device 40 to display a display image for checking the subject to be photographed, i.e., a so-called live view image (a through image), the imaging device 1 becomes a functional block required to complete image processing for display in synchronization with a timing at which the display device 40 displays a display image and generate display image data. Also, for example, if the imaging device 1 causes a moving image of a subject to be recorded in the recording medium (not shown), the imaging device 1 becomes a functional block required to complete image processing for recording in synchronization with a timing at which the image sensor 10 outputs pixel signals of each frame and generates record image data.

Also, because the recording processing section 26 is a functional block configured to perform an arithmetic process of performing a predetermined arithmetic process on the record image data recorded in the DRAM 30 and causing the processed image data to be recorded in the recording medium (not shown), the recording processing section 26 is a functional block which is not required to complete the arithmetic process (image processing) during a predetermined period. However, as described above, if the imaging device 1 causes a moving image of a subject to be recorded in the recording medium (not shown), the recording processing section 26 becomes a functional block required to cause record image data of each frame of a moving image generated by the image processing section 24 to be sequentially recorded in the recording medium (not shown) by performing a predetermined arithmetic process on the record image data at a timing at which the image sensor 10 outputs pixel signals of each frame as in the image processing section 24.

Next, a data transfer device provided in the image processing device 20 mounted on the imaging device 1 will be described. In the following description, the display processing section 25 will be described as a representative of the data transfer device according to the embodiment of the present invention. Even when the data transfer device according to the embodiment of the present invention is the pre-processing section 23, the image processing section 24, and the recording processing section 26, configurations and operations thereof can be assumed to be similar to those of the display processing section 25 to be described below.

Figure 2:
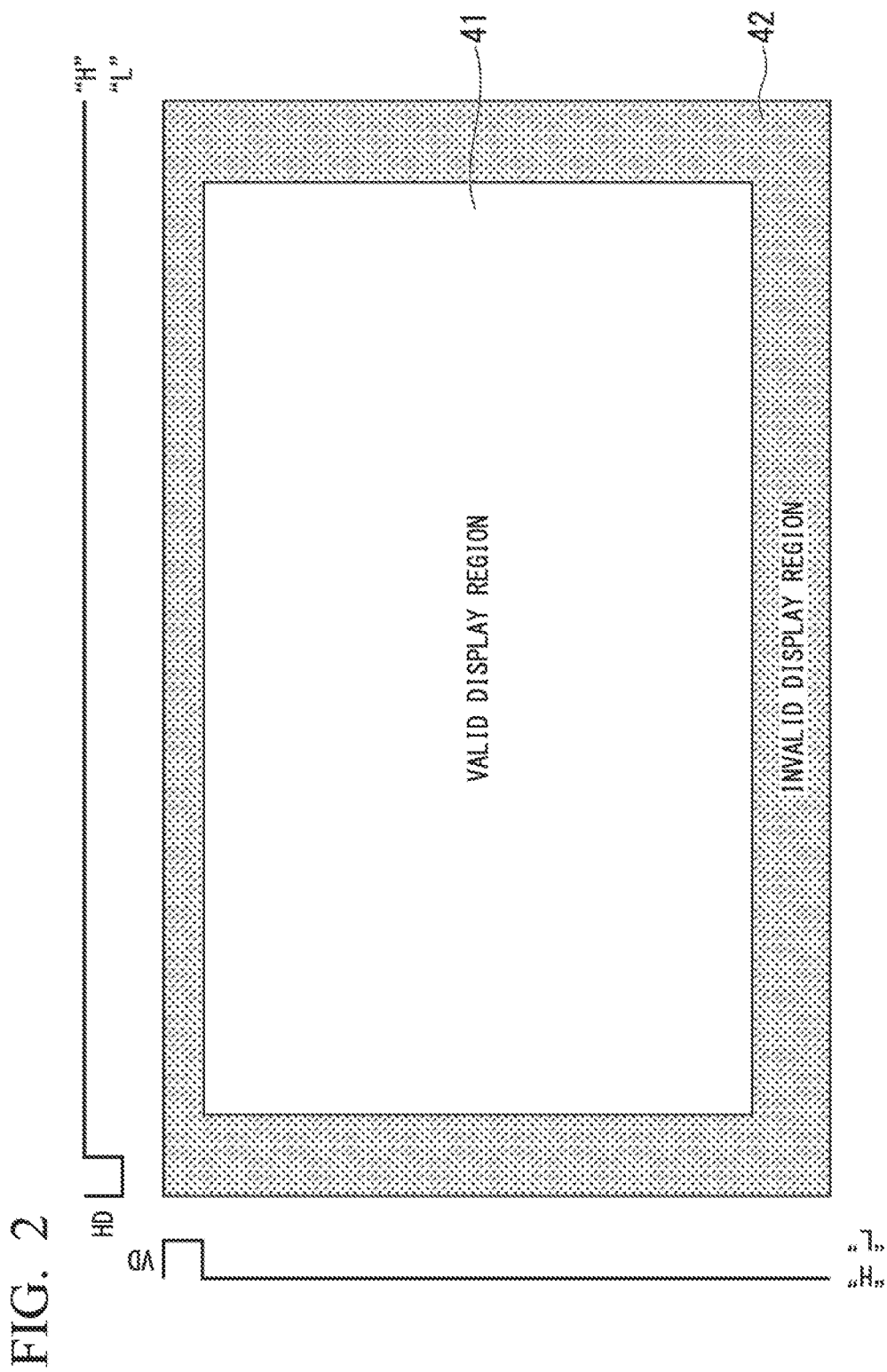
FIG. 2 is a diagram showing an outline of an operation of the data transfer device according to the embodiment of the present invention.

FIG. 2 is a diagram showing the outline of the operation of the display processing section 25 which is the data transfer device according to the embodiment of the present invention. In FIG. 2, an example of a display region of the display device 40 configured to display an image according to valid display image data output by the display processing section 25 performing an arithmetic process is schematically shown.

The display device 40 causes a display image according to the valid display image data output from the display processing section 25 to be displayed in a valid display region 41 of each frame at a timing synchronized with the vertical synchronization signal VD and the horizontal synchronization signal HD. More specifically, in the display device 40, a frame display period during which a display image of one frame is displayed starts from a timing of the vertical synchronization signal VD (the timing of a falling edge of the vertical synchronization signal VD in FIG. 2: "H" level→"L" level) and a vertical display period during which valid display image data of each line (row) is displayed is reached after a period of a predetermined number of horizontal synchronization signals HD (a vertical blanking period) elapses. Also, in the display device 40, a horizontal display period of one line starts from the timing of the horizontal synchronization signal HD (the timing of the falling edge of the horizontal synchronization signal HD in FIG. 2: "H" level→"L" level) and a pixel display period during which pixels (display pixels) included in valid display image data of each line are displayed is reached after a period of a predetermined number of display clock signals (a horizontal blanking period) elapses. Also, in FIG. 2, an invalid display region 42 where each display pixel included in the valid display image data is not displayed, i.e., where a display image according to the valid display image data is not displayed, is shown as a region where a vertical blanking period and a horizontal blanking period are combined. At such a timing, the display device 40 causes each display pixel included in the valid display image data of each line output from the display processing section 25 to be displayed within the valid display region 41.

As described above, the display processing section 25 outputs valid display image data obtained by performing a predetermined arithmetic process on display image data of each frame (read) acquired from the DRAM 30 to the display device 40 in synchronization with a timing at which the display device 40 displays the display image. At this time, the valid display image data output by the display processing section 25 is data of the display image including display pixels to be successively displayed in the valid display region 41 shown in FIG. 2. The display processing section 25 sequentially outputs valid display image data of each line, i.e., display pixels, to the display device 40 in synchronization with a display clock signal for displaying each display pixel in the horizontal synchronization signal HD.

More specifically, the display processing section 25 starts the output of valid display image data (display pixels) of a first line from an initial timing of the valid display region 41 of the first line in the display device 40 and sequentially outputs display pixels for one line to the display device 40 in synchronization with the display clock signal. Thereafter, the display processing section 25 starts the output of the valid display image data (display pixels) of a second line from the initial timing of the valid display region 41 of the second line in the display device 40 and sequentially outputs the display pixels for one line to the display device 40 in synchronization with the display clock signal. Thereafter, the display processing section 25 starts the output of valid display image data (display pixels) of the corresponding line from the first timing of the valid display region 41 of each line in the display device 40 to sequentially output the display pixels of each line to the display device 40, and outputs valid display image data for one frame. In the display processing section 25, the valid display image data for one frame is one transfer unit.

According to such an operation, the display processing section 25 outputs valid display image data based on the display image data for one frame generated by the image processing section 24 to the display device 40 and causes the display device 40 to display a display image according to the valid display image data. Thus, the display processing section 25 acquires (reads) the display image data of each line from the DRAM 30 according to the DMA transfer during the period in which the display device 40 displays the display image. However, in the image processing device 20, the DMA request output by the display processing section 25 for acquiring (reading) the display image data is not necessarily accepted by the DRAM bus arbitration section 22 provided in the image processing device 20 at a desired timing, i.e., in accordance with a timing at which the display device 40 displays the display image, at all times. Thus, the display processing section 25 is configured in consideration of a case in which the output DMA request is not accepted by the DRAM bus arbitration section 22.

Figure 3:
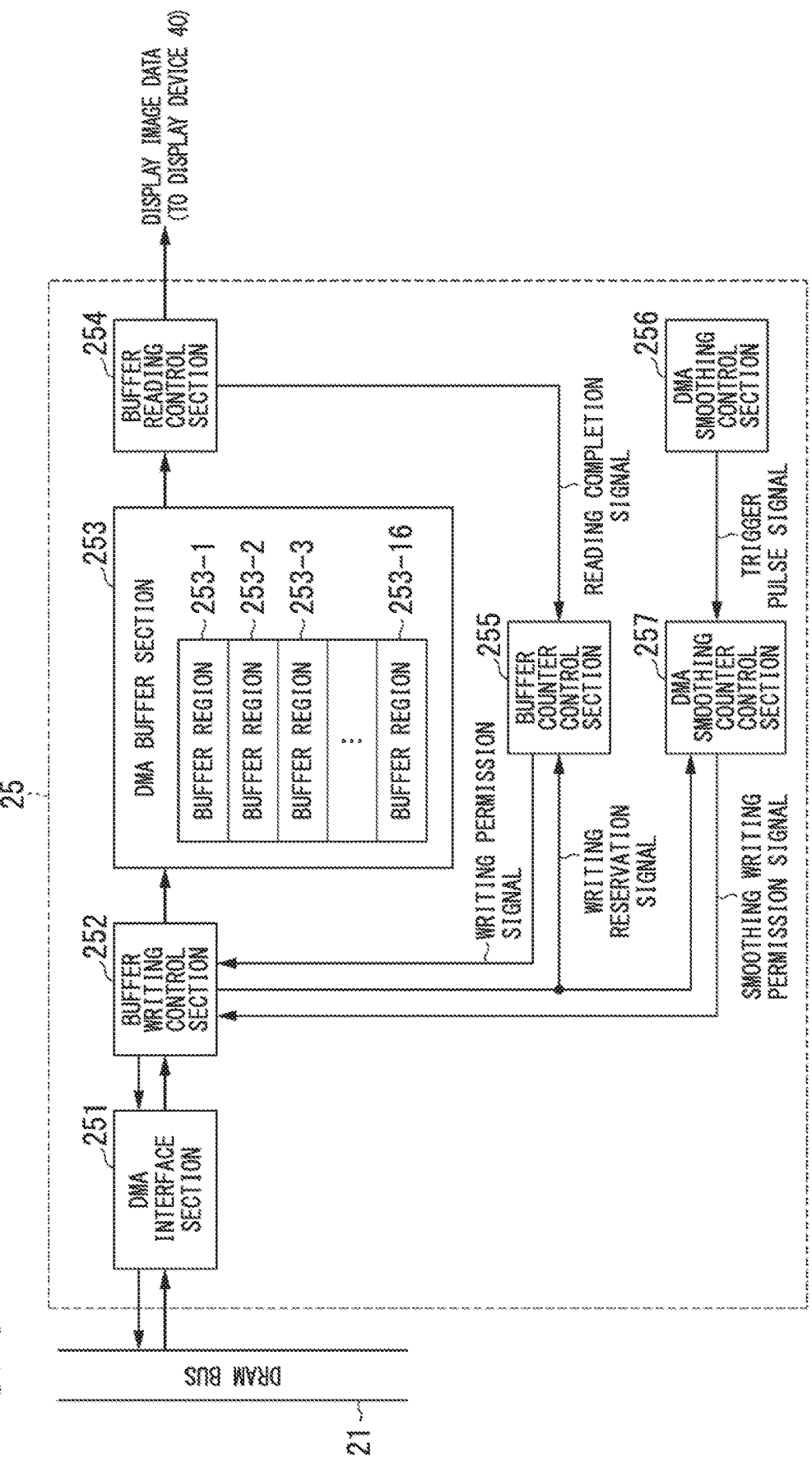
FIG. 3 is a block diagram showing a schematic configuration of the data transfer device according to the embodiment of the present invention.

Next, the configuration of the display processing section 25 will be described. FIG. 3 is a block diagram showing a schematic configuration of the display processing section 25 which is a data transfer device according to the embodiment of the present invention. In FIG. 3, the DRAM bus 21 to which the display processing section 25 is connected is also shown. The display processing section 25 shown in FIG. 3 includes a DMA interface section 251, a buffer writing control section 252, a DMA buffer section 253, a buffer reading control section 254, a buffer counter control section 255, a DMA smoothing control section 256, and a DMA smoothing counter control section 257. Also, in the configuration of the display processing section 25 shown in FIG. 3, the DMA buffer section 253 is provided to include 16 buffer regions (buffer regions 253-1 to 253-16).

Also, in the configuration of the display processing section 25 shown in FIG. 3, the illustration of an arithmetic section configured to perform a predetermined arithmetic process on display image data acquired (read) from the DRAM 30 according to the DMA transfer is omitted. If the display processing section 25 previously performs an arithmetic process on the display image data acquired (read) from the DRAM 30, the arithmetic section (not shown) is provided between the buffer writing control section 252 and the DMA buffer section 253. In this case, the valid display image data after the arithmetic process is performed is stored in the DMA buffer section 253. On the other hand, if the display processing section 25 subsequently performs an arithmetic process on display image data acquired (read) by the display processing section 25 from the DRAM 30, the arithmetic section (not shown) is provided between the DMA buffer section 253 and the buffer reading control section 254. In this case, the display image data before the arithmetic process is performed, i.e., the display image data acquired (read) from the DRAM 30, is stored in the DMA buffer section 253 as it is. In the following description, a configuration in which the display processing section 25 subsequently performs the arithmetic process on the display image data, i.e., the arithmetic section (not shown) performs an arithmetic process on the display image data read from the DMA buffer section 253 when the display image data acquired (read) acquired from the DRAM 30 is stored in the DMA buffer section 253 as it is and valid display image data is output to the display device 40, will be described.

The DMA interface section 251 is an interface section configured to perform the DMA transfer to/from the DRAM 30 in response to a request for display image data output from the buffer writing control section 252. Also, the DMA transfer of the DMA interface section 251 to/from the DRAM 30 is performed via the DRAM bus arbitration section 22.

More specifically, when the reading of the display image data is requested from the buffer writing control section 252, the DMA interface section 251 outputs a DMA request for acquiring display image data according to the DMA transfer to the DRAM bus arbitration section 22 via the DRAM bus 21. When the output DMA request is accepted by the DRAM bus arbitration section 22 and a notification indicating that the DMA request has been accepted is input from the DRAM bus arbitration section 22 via the DRAM bus 21, the DMA interface section 251 notifies the buffer writing control section 252 that the reading of the requested display image data has been accepted. In accordance with the input of the notification indicating that the DMA request has been accepted, the DMA interface section 251 outputs an access signal for the DRAM 30 (an address signal, a reading signal, or the like) for reading the display image data stored in the DRAM 30 to the DRAM bus arbitration section 22 via the DRAM bus 21. Thereby, the DRAM bus arbitration section 22 reads the display image data stored in the DRAM 30 in accordance with the access signal of the DRAM 30 output from the DMA interface section 251 via the DRAM bus 21 and outputs the read display image data to the DMA interface section 251 via the DRAM bus 21. The DMA interface section 251 outputs the display image data output from the DRAM bus arbitration section 22 via the DRAM bus 21 to the buffer writing control section 252 in accordance with the output DRAM access signal.

The buffer writing control section 252 controls the storage (writing) of the display image data output from the DMA interface section 251 in the DMA buffer section 253. More specifically, the buffer writing control section 252 requests the DMA interface section 251 to read the display image data in accordance with the writing permission signal output from the buffer counter control section 255 or the smoothing writing permission signal output from the DMA smoothing counter control section 257. When the buffer writing control section 252 is notified from the DMA interface section 251 that the reading of the requested display image data has been accepted, the buffer writing control section 252 outputs a writing reservation signal indicating that the storage (writing) of the display image data according to the writing permission signal or the smoothing writing permission signal in the DMA buffer section 253 has been reserved to each of the buffer counter control section 255 and the DMA smoothing counter control section 257. Thereafter, when the display image data read by the DMA interface section 251 according to the DMA transfer is output, the buffer counter control section 255 sequentially stores (writes) the output display image data in the DMA buffer section 253. At this time, the buffer writing control section 252 causes the display image data output from the DMA interface section 251 to be sequentially stored (written) in any free buffer region (where no display image data is stored) among the buffer regions 253-1 to 253-16 provided in the DMA buffer section 253.

Also, when the storage (writing) of display image data in any buffer region indicated according to the writing permission signal or the smoothing writing permission signal has been completed, the buffer writing control section 252 may output a writing completion signal indicating that the storage of the display image data has been completed to each of the buffer counter control section 255 and the DMA smoothing counter control section 257.

The DMA buffer section 253 is a storage section configured to temporarily store (save) the display image data sequentially output from the buffer writing control section 252 in accordance with control from the buffer writing control section 252. The DMA buffer section 253 includes, for example, a static random access memory (SRAM) or the like. The DMA buffer section 253 includes 16 buffer regions with a storage capacity for storing display image data read from the DRAM 30 according to one DMA transfer, i.e., a storage capacity for storing display image data to be read from the DRAM 30 according to 16 DMA transfers. Also, the buffer regions (the buffer regions 253-1 to 253-16) in the DMA buffer section 253 may be configured to include individual SRAMs or configured by dividing the same SRAM storage region.

Also, in accordance with the control from the buffer reading control section 254, the DMA buffer section 253 sequentially outputs the display image data stored in the buffer regions to the buffer reading control section 254.

Also, a timing at which the buffer writing control section 252 causes the display image data to be stored (written) in the buffer regions provided in the DMA buffer section 253 is not synchronized with a timing at which the buffer reading control section 254 reads the display image data stored in buffer regions provided in the DMA buffer section 253. Accordingly, the DMA buffer section 253 is an SRAM capable of controlling a data writing timing and a data reading timing at different timings.

The buffer reading control section 254 controls the output (reading) of the display image data stored in the DMA buffer section 253 to the display device 40. More specifically, the buffer reading control section 254 sequentially reads display image data stored in the DMA buffer section 253, i.e., display pixels, and sequentially outputs the read display image data to the display device 40 at a timing at which the display pixels are displayed in the valid display region 41 of the display device 40. The buffer reading control section 254 outputs a reading completion signal to the buffer counter control section 255 every time the reading of display image data from each buffer region provided in the DMA buffer section 253 is completed. A configuration in which a signal indicating the timing of the valid display region 41 in the display device 40 is generated by the display device 40 and output to the buffer reading control section 254 may be adopted and a configuration in which a display timing generation section (not shown) provided in the buffer reading control section 254 or the display processing section 25 generates the vertical synchronization signal VD and the horizontal synchronization signal HD at the same time may be adopted.

The buffer counter control section 255 is a counter for managing the free storage capacity of the DMA buffer section 253 in units of buffer regions. The value of the counter of the buffer counter control section 255 (hereinafter referred to as a "counter value") is a value obtained by counting the number of free buffer regions (where no display image data is stored) among the buffer regions provided in the DMA buffer section 253. An initial value of the counter value of the buffer counter control section 255 is the number of buffer regions provided in the DMA buffer section 253, i.e., a state in which all buffer regions provided in the DMA buffer section 253 are free. The buffer counter control section 255 initializes the counter value at a timing of a start of the vertical synchronization signal VD for starting the display of the display image of each frame in the display device 40. Because the 16 buffer regions are provided in the configuration of the DMA buffer section 253 shown in FIG. 3, the initial value of the counter value of the buffer counter control section 255 is 16.

When the counter value is a value other than 0, the buffer counter control section 255 outputs a writing permission signal indicating that the reading of display image data is permitted (requested) to the buffer writing control section 252. Thereby, the buffer writing control section 252 requests the DMA interface section 251 to read the display image data in accordance with the input writing permission signal and the display image data read from the DRAM 30 by the DMA interface section 251 according to the DMA transfer is stored (written) in a free buffer region of the DMA buffer section 253 by the buffer writing control section 252. Also, the buffer counter control section 255 decrements the counter value by one every time the writing reservation signal is input from the buffer writing control section 252. That is, the buffer writing control section 252 decrements the number of free buffer regions by one when the display image data is stored (written) in the DMA buffer section 253 after the writing reservation signal. On the other hand, the buffer writing control section 252 increments the counter value by one every time a reading completion signal is input from the buffer reading control section 254. That is, every time the display image data stored in the DMA buffer section 253 is read by the buffer reading control section 254 and output to the display device 40, the buffer writing control section 252 increments the number of free buffer regions by one.

The DMA smoothing control section 256 is a signal generation section configured to output a trigger pulse signal at a preset time interval (hereinafter referred to as a "time interval"). The DMA smoothing control section 256 outputs the generated trigger pulse signal to the DMA smoothing counter control section 257. The trigger pulse signal output to the DMA smoothing counter control section 257 by the DMA smoothing control section 256 indicates a timing at which the DMA smoothing counter control section 257 outputs the smoothing writing permission signal to the buffer writing control section 252.

Here, the time interval preset in the DMA smoothing control section 256 is, for example, a time indicating a cycle in which the buffer reading control section 254 reads the display image data stored in the DMA buffer section 253, i.e., a time indicating a cycle of the reading completion signal, or the like. Also, a time represented by the time interval may be, for example, a value represented by the number of clock signals having a predetermined cycle. Also, the setting of the time interval for the DMA smoothing control section 256 can be performed by, for example, a control section such as a central processing unit (CPU) configured to control the entire imaging device 1 and a control section (not shown) configured to control the entire image processing device 20. However, in the present invention, a time of the time interval preset for the DMA smoothing control section 256 and a method of setting the time interval for the DMA smoothing control section 256 are not particularly specified.

The DMA smoothing counter control section 257 is a counter configured to count the number of trigger pulse signals output from the DMA smoothing control section 256. A value of the counter of the DMA smoothing counter control section 257 (a counter value) represents the number of DMA requests successively output to store the display image data in a buffer region which is free (where no display image data is stored) in the DMA buffer section 253. An initial value of the counter value of the DMA smoothing counter control section 257 is 0. That is, the initial value indicates a state in which the display processing section 25 makes no DMA request. Similar to the buffer counter control section 255, the DMA smoothing counter control section 257 initializes the counter value at a timing of a start of the vertical synchronization signal VD for starting the display of the display image of each frame in the display device 40.

Every time a trigger pulse signal is input from the DMA smoothing control section 256, the DMA smoothing counter control section 257 increments the counter value by one. That is, every time the trigger pulse signal is input from the DMA smoothing control section 256, the DMA smoothing counter control section 257 increments the number of DMA requests which are successively output by one. Similar to the buffer counter control section 255, the DMA smoothing counter control section 257 also outputs a smoothing writing permission signal indicating that the reading of the display image data is permitted (requested) to the buffer writing control section 252 when the counter value is a value other than 0. Thereby, the buffer writing control section 252 requests the DMA interface section 251 to read the display image data in accordance with the input smoothing writing permission signal and the display image data read from the DRAM 30 by the DMA interface section 251 according to the DMA transfer is stored (written) in a free buffer region of the DMA buffer section 253 by the buffer writing control section 252. Similar to the buffer counter control section 255, the DMA smoothing counter control section 257 decrements the counter value by one every time a writing reservation signal is input from the buffer writing control section 252. That is, similar to the buffer counter control section 255, the DMA smoothing counter control section 257 decrements the number of DMA requests which are successively output by one when the display image data is stored (written) in the DMA buffer section 253 after the writing reservation signal.

According to such a configuration, the display processing section 25 outputs valid display image data obtained by performing a predetermined arithmetic process on acquired (read) display image data of each frame in synchronization with a timing at which the display device 40 displays the display image while sequentially acquiring (reading) the display image data for one frame generated by the image processing section 24 from the DRAM 30 according to the DMA transfer.

Then, the display processing section 25 controls the number or intervals of DMA requests to be output so that the inhibition of the DMA transfer from each functional block provided in the image processing device 20 is avoided when the display image data of each frame is acquired (read) from the DRAM 30 according to the DMA transfer. More specifically, the display processing section 25 controls the number or intervals of DMA requests to be successively output according to a configuration of the buffer writing control section 252, the DMA smoothing counter control section 257, and the DMA smoothing control section 256.

More specifically, the display processing section 25 controls the number of DMA requests to be successively output according to the counter value of the DMA smoothing counter control section 257. Also, in the display processing section 25, according to the interval of the trigger pulse signal output by the DMA smoothing control section 256, i.e., the time interval preset in the DMA smoothing control section 256, an available interval of a DMA request is controlled when DMA requests are successively output. In the display processing section 25, switching between a DMA smoothing period during which the DMA requests are successively output while the number or intervals of outputs is controlled and a normal DMA period during which DMA requests are sequentially output for display on the display device 40 is performed by performing switching between the smoothing writing permission signal and the writing permission signal according to when the buffer writing control section 252 requests the DMA interface section 251 to read the display image data.

Here, a method of controlling the number or intervals of DMA requests to be successively output by the display processing section 25 during the DMA smoothing period will be described. In the display processing section 25, when the DMA smoothing counter control section 257 is initialized, the counter value of the DMA smoothing counter control section 257 is 0. Thus, the DMA smoothing counter control section 257 does not output the smoothing writing permission signal to the buffer writing control section 252 immediately after initialization is performed. Thereafter, when the trigger pulse signal is input after a predetermined time set in the DMA smoothing control section 256 elapses, the counter value of the DMA smoothing counter control section 257 becomes 1. Thereby, the DMA smoothing counter control section 257 outputs the smoothing writing permission signal to the buffer writing control section 252, and the buffer writing control section 252 requests the DMA interface section 251 to read the display image data, so that the DMA request of the display processing section 25 is output.

Then, when the DRAM bus arbitration section 22 receives the DMA request output by the display processing section 25, the counter value of the DMA smoothing counter control section 257 becomes 0 again. Thereafter, when a predetermined time set in the DMA smoothing control section 256 has elapsed, the counter value of the DMA smoothing counter control section 257 similarly becomes 1 in accordance with the trigger pulse signal input from the DMA smoothing control section 256 and the DMA request of the display processing section 25 is output.

In this manner, if the DMA requests output during the DMA smoothing period are sequentially accepted by the DRAM bus arbitration section 22, the display processing section 25 outputs the DMA request at every predetermined time interval set in the DMA smoothing control section 256. That is, when the DMA requests are successively output during the DMA smoothing period, the display processing section 25 makes the predetermined time interval set in the DMA smoothing control section 256 free and outputs each DMA request. Thereby, each functional block provided in the image processing device 20 is configured so that the DMA transfer according to the DMA request output during the DMA smoothing period in the display processing section 25 is not inhibited by the DMA transfer according to the DMA request output by the display processing section 25.

However, as described above, the display processing section 25 s required to output valid display image data in synchronization with the timing at which the display device 40 displays the display image. Thus, if a period during which the DMA request output by making a predetermined time interval free is not accepted by the DRAM bus arbitration section 22 continues for a long time even during the DMA smoothing period, the display processing section 25 acquires necessary display image data from the DRAM 30 according to the DMA transfer by outputting each DMA request without making any interval free.

More specifically, when the output DMA request is not accepted by the DRAM bus arbitration section 22 and a time for a plurality of predetermined time intervals set in the DMA smoothing control section 256 has elapsed, a counter value of the DMA smoothing counter control section 257 is larger than 1 because a plurality of trigger pulse signals are input to the DMA smoothing counter control section 257. For example, if three trigger pulse signals are input to the DMA smoothing counter control section 257, the counter value becomes 3. This indicates that the output DMA request has not been accepted even when a period during which the display processing section 25 outputs three DMA requests has elapsed. Thus, even when DMA requests subsequently output by the display processing section 25 have been accepted during the DMA smoothing period one by one, there is a possibility that all DMA transfers will not be completed until a necessary period, i.e., the acquisition (reading) of display image data according to two DMA transfers which have not been accepted will not be completed until a necessary period.

Therefore, the DMA smoothing counter control section 257 requests the DMA interface section 251 to successively read display image data to the buffer writing control section 252 by outputting smoothing permission signals for the counter value (three smoothing permission signals if the counter value is 3) to the buffer writing control section 252. That is, the DMA smoothing counter control section 257 continuously outputs the smoothing writing permission signal to the buffer writing control section 252 until the counter value becomes 0 again. Thereby, the buffer writing control section 252 successively (continuously) outputs requests for reading display image data to the DMA interface section 251 and the DMA interface section 251 successively outputs DMA requests. That is, the display processing section 25 successively outputs the DMA requests even during the DMA smoothing period.

In this manner, if there is a DMA request which has not been accepted by the DRAM bus arbitration section 22 even during the DMA smoothing period, the display processing section 25 successively outputs the DMA requests so that the DMA transfers are completed until the necessary period. Thereby, during the DMA smoothing period, the display processing section 25 secures the DMA transfer of the display image data according to the necessary number of DMA transfers, i.e., a necessary transfer rate for displaying the display image on the display device 40.

Also, when the output of the valid display image data of the valid display region 41 to the display device 40 is started, the display processing section 25 is required to continue the securement of a necessary transfer rate in order to output valid display image data in synchronization with the timing at which the display device 40 displays the display image. Therefore, the display processing section 25 switches the method of controlling the output of the DMA request. More specifically, the display processing section 25 performs switching from DMA request output control during the DMA smoothing period in which the inhibition of the DMA transfer in each functional block provided in the image processing device 20 is avoided by outputting the DMA request while controlling the number or intervals of outputs to DMA request output control during a normal DMA period in which DMA requests are sequentially output in accordance with a storage capacity of display image data stored in the DMA buffer section 253.

More specifically, the buffer writing control section 252 performs switching so that a request for reading display image data output to the DMA interface section 251 in accordance with the smoothing writing permission signal during the DMA smoothing period is output in accordance with a writing permission signal during the normal DMA period. Switching of the request for reading the display image data by the buffer writing control section 252 is performed at a predetermined timing. For example, the buffer writing control section 252 performs switching from the DMA smoothing period to the normal DMA period at a timing when a predetermined time has elapsed, a timing when a period of a predetermined number of horizontal synchronization signals HD has elapsed, or the like after initialization is performed at a timing of a start of the vertical synchronization signal VD for enabling the display device 40 to start the display of a display image of each frame. Also, for example, the buffer writing control section 252 performs switching from the DMA smoothing period to the normal DMA period at a timing when the storage of display image data acquired according to the DMA transfer in all buffer regions provided in the DMA buffer section 253 has been completed, i.e., a timing when the storage capacity of the DMA buffer section 253 is in a full state.

The buffer writing control section 252 can determine the full state of the storage capacity of the DMA buffer section 253 from the writing permission signal output by the buffer counter control section 255, for example, although the buffer writing control section 252 may be configured to monitor the storage capacity of the DMA buffer section 253. More specifically, the writing permission signal indicates that the reading of the display image data is permitted (requested) when the counter value of the buffer counter control section 255 which indicates a free storage capacity of the DMA buffer section 253 in units of buffer regions is a counter value other than 0. In other words, when the writing permission signal does not indicate that the reading of the display image data is permitted (requested), it is indicated that the storage capacity of the DMA buffer section 253 is in the full state. In the display processing section 25, after the initialization is performed at a timing of a start of the vertical synchronization signal VD for starting the display of the display image of each frame in the display device 40, the smoothing writing permission signal according to when the reading of the display image data is requested is switched to the writing permission signal at a timing when a state in which the writing permission signal does not initially indicate that the reading of the display image data is permitted (requested) is reached.

Next, an example of the operation of the display processing section 25 will be described. FIG. 4 is a timing chart schematically showing an example of the operation of the display processing section 25 which is the data transfer device according to the embodiment of the present invention. In FIG. 4, an example of a timing of a horizontal display period for 10 lines (for 10 cycles of the horizontal synchronization signal HD) from a timing of a start of the vertical synchronization signal VD within a frame display period during which the display device 40 displays a display image of one frame is schematically shown. That is, in FIG. 4, an example including the timing of switching from the DMA smoothing period to the normal DMA period in the display processing section 25 is schematically shown.

In FIG. 4, timings and states of the vertical synchronization signal VD, the horizontal synchronization signal HD, a display line, and a valid display region identification signal are shown as signals related to the display device 40. Here, the display line represents a line (a row) of display image data (valid display image data) corresponding to each horizontal synchronization signal HD. Also, the valid display region identification signal indicates a range of the valid display region 41 in each horizontal synchronization signal HD, i.e., a period during which the display processing section 25 outputs valid display image data. Also, in the valid display region identification signal, an "H" level represents a range of the valid display region 41, and an "L" level represents a region outside the range of the valid display region 41, i.e., the range of the invalid display region 42.

Also, in FIG. 4, timings and states of a DMA request signal, a buffer writing signal, a buffer reading signal, a trigger pulse signal, a DMA smoothing counter control section (a counter value), a smoothing writing permission signal, a writing permission signal, and a buffer counter control section (a counter value) serving as signals related to the display processing section 25 are shown. Here, the DMA request signal is a signal of a DMA request output for acquiring (reading) the display image data from the DRAM 30 according to the DMA transfer, and the "H" level thereof indicates that the DMA transfer is requested. Also, the buffer writing signal is a control signal for writing the display image data output from the DRAM 30 in response to the DMA request in each buffer region provided in the DMA buffer section 253, and the "H" level thereof indicates a timing at which the display image data is written. Also, the buffer reading signal is a control signal for reading the display image data stored in each buffer region provided in the DMA buffer section 253, and the "H" level thereof indicates a timing at which the display image data is read.

Also, the trigger pulse signal is a trigger pulse signal output by the DMA smoothing control section 256. When the "H" level of the trigger pulse signal is detected, the DMA smoothing counter control section 257 increments the counter value. Also, the DMA smoothing counter control section (the counter value) indicates the counter value of the DMA smoothing counter control section 257. As described above, although the counter value of the DMA smoothing counter control section 257 is decremented every time a writing reservation signal is input from the buffer writing control section 252, i.e., every time a DMA request is accepted, an example in which the counter value is decremented when the "H" level of the buffer writing signal is detected will be described for ease of description in FIG. 4. Also, the smoothing writing permission signal is a smoothing writing permission signal output by the DMA smoothing counter control section 257 and the "H" level thereof indicates that the reading of the display image data is permitted (requested).

Also, the writing permission signal is a writing permission signal output from the buffer counter control section 255, and the "H" level thereof indicates that the reading of display image data is permitted (requested). Also, the buffer counter control section (the counter value) indicates the counter value of the buffer counter control section 255. As described above, the counter value of the buffer counter control section 255 is decremented every time a writing reservation signal is input from the buffer writing control section 252, i.e., every time a DMA request is accepted, and is incremented every time a reading completion signal is input from the buffer reading control section 254, i.e., every time the reading of display image data from any one of the buffer regions provided in the DMA buffer section 253 is completed. However, in FIG. 4, for ease of description, an example in which the counter value is decremented when the "H" level of the buffer writing signal is detected and incremented when the "H" level of the buffer reading signal is detected will be described.

Also, in the example shown in FIG. 4, an example of a timing when eight buffer regions are used as the storage region of the DMA buffer section 253 for storing the display image data for one line is shown. That is, the display processing section 25 acquires (reads) display image data for one line from the DRAM 30 according to eight DMA transfers. Also, because the DMA buffer section 253 includes the 16 buffer regions (the buffer regions 253-1 to 253-16), the display processing section 25 can previously acquire (read) display image data for two lines to be output to the display device 40 and store the display image data in the DMA buffer section 253.

As described above, the display processing section 25 is initialized at a timing of a start of the vertical synchronization signal VD (more specifically, the timing of the falling edge of the vertical synchronization signal VD: "H" level→"L" level). In the display processing section 25, the DMA smoothing period is reached from the timing of this initialization.

In the display processing section 25, according to the initialization, the counter value of the buffer counter control section 255 is initialized to 16. Also, in the display processing section 25, the counter value of the DMA smoothing counter control section 257 is initialized to 0 according to the initialization. Then, in the display processing section 25, after the initialization is cancelled, the DMA smoothing control section 256 starts the output of the trigger pulse signal at a preset time interval. That is, the control of the timing (interval) of each DMA request to be output during the DMA smoothing period in the display processing section 25 starts.

During the DMA smoothing period, the DMA smoothing counter control section 257 increments the counter value when the "H" level of the trigger pulse signal output from the DMA smoothing control section 256 is detected after a preset time elapses, and outputs the smoothing writing permission signal to the buffer writing control section 252. Thereby, the buffer writing control section 252 requests the DMA interface section 251 to read the display image data and the DMA interface section 251 outputs the DMA request signal of the "H" level. When the output DMA request signal is accepted by the DRAM bus arbitration section 22, the DMA interface section 251 sets the DMA request signal to the "L" level and notifies the buffer writing control section 252 that the DMA transfer, i.e., the reading of the requested display image data, has been accepted. Thereby, the buffer writing control section 252 outputs the writing reservation signal to each of the buffer counter control section 255 and the DMA smoothing counter control section 257, and each of the buffer counter control section 255 and the DMA smoothing counter control section 257 decrements the counter value thereof. Also, the DMA interface section 251 reads the display image data from the DRAM 30 according to the DMA transfer and outputs the display image data to the buffer writing control section 252. The buffer writing control section 252 outputs the buffer writing signal to cause the display image data to be stored in the buffer region of the DMA buffer section 253.

Thereafter, likewise, during the DMA smoothing period in the display processing section 25, each component operates as described above and causes the display image data to be stored in all the buffer regions provided in the DMA buffer section 253. That is, in the display processing section 25, the DMA smoothing counter control section 257 outputs the smoothing writing permission signal by incrementing the counter value every time the DMA smoothing counter control section 257 detects the "H" level of the trigger pulse signal output from the DMA smoothing control section 256 and decrements the counter value every time the writing reservation signal is output from the buffer writing control section 252 (every time the "H" level of the writing reservation signal is detected). Also, in the display processing section 25, the buffer writing control section 252 requests the DMA interface section 251 to read the display image data in accordance with the smoothing writing permission signal and the buffer writing control section 252 outputs the writing reservation signal in accordance with the notification from the DMA interface section 251 and causes the display image data output from the DMA interface section 251 to be stored in the DMA buffer section 253. Also, in the display processing section 25, the buffer counter control section 255 decrements the counter value every time the writing reservation signal is output from the buffer writing control section 252 (every time the "H" level of the writing reservation signal is detected). Also, in the display processing section 25, the DMA interface section 251 outputs a DMA request signal in accordance with a request from the buffer writing control section 252, and notifies the buffer writing control section 252 that the DMA transfer has been accepted and outputs the acquired (read) display image data to the buffer writing control section 252 according to the DMA transfer when the output DMA request signal has been accepted by the DRAM bus arbitration section 22.

According to such an operation, the display processing section 25 outputs DMA requests to be successively output by making a predetermined interval free so that the DMA transfer of each functional block provided in the image processing device 20 is not inhibited during the DMA smoothing period. Then, before the valid display image data is output to the display device 40 during the DMA smoothing period, the display processing section 25 previously acquires (reads) display image data for a predetermined number of lines (here, for two lines) according to the DMA transfer and stores the display image data in the DMA buffer section 253.

Also, in FIG. 4, as a reference, the counter value of the buffer counter control section 255 in a case in which the display processing section 25 successively outputs the DMA requests without making an interval is indicated by a broken line C1. This corresponds to the operation when a DMA request is output in accordance with the writing permission signal output by the buffer counter control section 255 during the DMA smoothing period of the display processing section 25. Also, this operation also corresponds to the operation during a period in which the DMA transfer is frequently performed in the functional block of the conventional configuration. Naturally, if the DMA requests are successively output without making any interval free even in the display processing section 25, a time taken to store the display image data acquired from the DRAM 30 according to the DMA transfer in all the buffer regions provided in the DMA buffer section 253 is shortened. However, in this case, DMA transfers of other functional blocks provided in the image processing device 20 may be inhibited. In the operation indicated by the broken line C1 in FIG. 4, a state in which another functional block provided in the image processing device 20 cannot perform the DMA transfer during a period for one cycle of the horizontal synchronization signal HD is reached.

However, as shown in FIG. 4, in the display processing section 25, it is only necessary to cause the display image data acquired from the DRAM 30 to be stored in all the buffer regions provided in the DMA buffer section 253 according to the DMA transfer until the output of the valid display image data of the valid display region 41 to the display device 40 is started. That is, in the display processing section 25, it is only necessary to cause the display image data to be stored in all the buffer regions provided in the DMA buffer section 253 until the blanking period in which the display image according to the valid display image data is not displayed on the display device 40 (the period of the invalid display region 42) ends. From this fact, a method of preventing the DMA transfer of another functional block provided in the image processing device 20 from being inhibited by making a predetermined interval free and outputting the DMA request may be more advantageous for the entire system than a method in which a time is shortened but the bus bandwidth of the DRAM bus 21 is occupied by outputting successively the DMA requests.

However, if there is no problem even when the DMA requests are successively output during a short period, the display processing section 25 can be operated to perform the DMA transfer for a short time within the DMA smoothing period as indicated by the broken line C1 in FIG. 4. More specifically, the time interval preset in the DMA smoothing control section 256 provided in the display processing section 25 is set to a short time. Thereby, an interval at which the DMA smoothing control section 256 outputs the trigger pulse signal is shortened and a cycle in which the DMA smoothing counter control section 257 increments the counter value, i.e., a cycle in which the DMA smoothing counter control section 257 outputs the smoothing writing permission signal to the buffer writing control section 252, is also shortened. Thereby, the cycle of the DMA request output by the display processing section 25 in accordance with the smoothing writing permission signal is shortened. For example, when the time interval preset in the DMA smoothing control section 256 is set to "0", the smoothing writing permission signal similar to the writing permission signal shown in FIG. 4 can be output to the DMA smoothing counter control section 257. That is, it is possible to cause the DMA smoothing counter control section 257 to output the smoothing writing permission signal indicating that the reading of display image data is permitted (requested) at all times. Thereby, the display processing section 25 can successively output the DMA requests during a short period similar to that of the broken line C1 shown in FIG. 4 and can cause the display image data acquired from the DRAM 30 according to the DMA transfer to be stored in all buffer regions provided in the DMA buffer section 253.

Also, in FIG. 4, an example of the operation when the DRAM bus arbitration section 22 does not accept the DMA request output during the DMA smoothing period within a range T1 surrounded by a broken line is shown. More specifically, an example in which the DMA transfer corresponding to the smoothing writing permission signal output in accordance with a seventh trigger pulse signal is not accepted until the DMA smoothing control section 256 outputs an eighth trigger pulse signal is shown. As described above, if the period during which the DMA request is not accepted is continuously lengthened even during the DMA smoothing period, the display processing section 25 outputs the DMA requests without making any interval free to secure the necessary number of DMA transfers.

In the range T1 shown in FIG. 4, because the counter value of the DMA smoothing counter control section 257 becomes 2, the DMA interface section 251 outputs a DMA request signal so that two DMA transfers are successively performed. Thereby, a number of DMA transfers required by the display processing section 25 are restored and necessary display image data is stored in the DMA buffer section 253. Also, after the DMA transfer is restored, the display processing section 25 avoids the inhibition of the DMA transfer of each functional block provided in the image processing device 20 again by making a predetermined interval free and outputting the DMA requests as shown in FIG. 4.

In this manner, during the DMA smoothing period, the display processing section 25 stores display image data in all the buffer regions provided in the DMA buffer section 253 by securing the DMA transfer of the display image data at a necessary transfer rate and performing the DMA transfer in advance while avoiding the inhibition of the DMA transfer in each functional block provided in the image processing device 20. When the display image data is stored in all the buffer regions provided in the DMA buffer section 253, the display processing section 25 completes the output control of the DMA request during the DMA smoothing period and is switched to DMA request output control of the normal DMA period during which the DMA requests are sequentially output in accordance with a storage capacity of the display image data stored in the DMA buffer section 253. Also, switching from the DMA smoothing period to the normal DMA period in the display processing section 25 is performed only once during a period in which valid display image data for one frame is output to the display device 40. In other words, in a series of operations in which the display processing section 25 outputs valid display image data for one frame to the display device 40, the switching is performed at only a first timing when the storage of the display image data in all the buffer regions provided in the DMA buffer section 253 is completed.

When the switching from the DMA smoothing period to the normal DMA period is performed, the display processing section 25 reads the display image data stored in the DMA buffer section 253 during the normal DMA period and outputs valid display image data obtained by performing a predetermined arithmetic process on the read display image data to the display device 40. Also, the display processing section 25 acquires (reads) new display image data from the DRAM 30 according to the DMA transfer during the normal DMA period and causes the new display image data to be stored in a buffer region of the DMA buffer section 253 which is made free by reading the stored display image data.

More specifically, during the normal DMA period, the buffer reading control section 254 outputs a buffer reading signal when the valid display region identification signal is at the "H" level representing the valid display region 41 to read display image data stored in the buffer region of the DMA buffer section 253 and output valid display image data obtained by the arithmetic section (not shown) performing an arithmetic process to the display device 40. Thereby, the display device 40 causes each display pixel included in the valid display image data output from the display processing section 25 to be displayed within the valid display region 41. At this time, the buffer reading control section 254 outputs a reading completion signal to the buffer counter control section 255 every time the reading of the display image data from one buffer region is completed. Thereby, the buffer counter control section 255 increments the counter value and outputs the writing permission signal to the buffer writing control section 252 in accordance with the increment of the counter value. Then, the buffer counter control section 255 requests the DMA interface section 251 to read the display image data and the DMA interface section 251 outputs the DMA request signal of the "H" level. As in the DMA smoothing period, when the output DMA request signal is accepted by the DRAM bus arbitration section 22, the DMA interface section 251 sets the DMA request signal to the "L" level and notifies the buffer writing control section 252 that the DMA transfer, i.e., the reading of the requested display image data, has been accepted. Thereby, as in the DMA smoothing period, the buffer writing control section 252 outputs the writing reservation signal to each of the buffer counter control section 255 and the DMA smoothing counter control section 257 and each of the buffer counter control section 255 and the DMA smoothing counter control section 257 decrements the counter value thereof. Also, as in the DMA smoothing period, the DMA interface section 251 reads the display image data from the DRAM 30 according to the DMA transfer and outputs the read display image data to the buffer writing control section 252 and the buffer writing control section 252 outputs the buffer writing signal to cause new display image data to be stored in the buffer region of the DMA buffer section 253.

Thereafter, likewise, during the normal DMA period in the display processing section 25, each component operates as described above to output valid display image data for one frame to the display device 40 while performing the reading of the display image data stored in each buffer region provided in the DMA buffer section 253 and the storage of new display image data in the buffer region from which the display image data is read in the same period. That is, in the display processing section 25, the buffer reading control section 254 reads the display image data stored in the DMA buffer section 253 in accordance with the "H" level of the valid display region identification signal to output the reading completion signal and output valid display image data according to the read display image data to the display device 40. Also, in the display processing section 25, the buffer counter control section 255 increments the counter value every time the reading completion signal is output from the buffer reading control section 254 (every time the "H" level of the reading completion signal is detected) to output the writing permission signal, and decrements the counter value every time the writing reservation signal is output from the buffer writing control section 252 (every time the "H" level of the writing reservation signal is detected). Also, in the display processing section 25, the buffer writing control section 252 requests the DMA interface section 251 to read the display image data in accordance with the writing permission signal, outputs the writing reservation signal in accordance with the notification from the DMA interface section 251 and causes the new display image data output from the DMA interface section 251 to be stored in the DMA buffer section 253. Also, in the display processing section 25, the DMA interface section 251 outputs a DMA request signal in response to a request from the buffer writing control section 252 and notifies the buffer writing control section 252 that the DMA transfer has been accepted and outputs the acquired (read) new display image data to the buffer writing control section 252 according to the DMA transfer when the output DMA request signal has been accepted by the DRAM bus arbitration section 22.

According to such an operation, the display processing section 25 outputs valid display image data based on a display image data for one frame generated by the image processing section 24 to the display device 40 in accordance with the timing at which the display device 40 displays the display image during the normal DMA period and causes the display device 40 to display the display image according to the valid display image data. Then, the display processing section 25 acquires (reads) new display image data according to a DMA transfer so that valid display image data to be output to the display device 40 can be in time during the normal DMA period and stores the new display image data in a free buffer region of the DMA buffer section 253. That is, during the normal DMA period, the display processing section 25 outputs valid display image data for one frame to the display device 40 while performing the reading of the display image data stored in the DMA buffer section 253 in accordance with a display period of the valid display region 41 in the display device 40 and the acquisition (reading) of display image data for another line from the DRAM 30 according to the DMA transfer in parallel.

Also, an example of an operation in a case in which the DRAM bus arbitration section 22 does not accept a DMA request output during the normal DMA period within a range T2 surrounded by a broken line is shown in FIG. 4. More specifically, an example when four DMA transfers for storing new display image data in the four buffer regions read from the DMA buffer section 253 are not accepted is shown. In this case, because the counter value of the buffer counter control section 255 is sequentially incremented in the display processing section 25, the buffer counter control section 255 outputs the writing permission signal for the counter value to the buffer writing control section 252 and therefore requests the DMA interface section 251 to successively read the display image data to the buffer writing control section 252. That is, the buffer counter control section 255 continuously outputs the writing permission signal to the buffer writing control section 252 until the counter value becomes 0 again. Thereby, the buffer writing control section 252 successively (continuously) outputs requests for reading the display image data to the DMA interface section 251 and the DMA interface section 251 successively outputs DMA requests. That is, if the output DMA request is not accepted even during the normal DMA period, the display processing section 25 successively outputs the DMA requests and secures the DMA transfers of the display image data at a necessary transfer rate.

Because the counter value of the buffer counter control section 255 becomes 4 within the range T2 shown in FIG. 4, the DMA interface section 251 outputs a DMA request signal so that four DMA transfers are successively performed. Thereby, a necessary number of DMA transfers for enabling the display processing section 25 to output valid display image data to be displayed within the valid display region 41 of the display device 40 are restored and necessary new display image data is stored in the DMA buffer section 253.

Also, in the example shown within the range T2 in FIG. 4, an example in which eight DMA requests are successively output because the DMA requests are successively output but the buffer reading control section 254 also performs the reading from the DMA buffer section 253 in parallel is shown. More specifically, in the example shown within the range T2 in FIG. 4, the counter value of the buffer counter control section 255 is 4 at maximum. Thus, the display processing section 25 successively outputs four DMA requests. However, in the example shown within the range T2 in FIG. 4, the writing of new display image data to the DMA buffer section 253 in the buffer writing control section 252 (the buffer writing signal) and the reading of the display image data stored in the DMA buffer section 253 in the buffer reading control section 254 (the buffer reading signal) are performed at timings in the same period. Thus, in the example shown within the range T2 in FIG. 4, the decrement corresponding to the "H" level of the buffer writing signal corresponding to the writing reservation signal and the increment corresponding to the "H" level of the buffer reading signal corresponding to the buffer reading signal are performed in the same period and the counter value of the buffer counter control section 255 does not change. Thereby, in the example shown within the range T2 in FIG. 4, the display processing section 25 successively outputs eight DMA requests.

Also, after the DMA transfer is restored, the display processing section 25 performs the DMA transfer for acquiring (reading) new display image data stored in a free buffer region every time the buffer region of the DMA buffer section 253 is free as shown in FIG. 4.

In this manner, the display processing section 25 outputs valid display image data to the display device 40 while securing the DMA transfer of new display image data at the necessary transfer rate during the normal DMA period. Also, the operation of the normal DMA period in the display processing section 25 corresponds to an operation of the normal DMA transfer in the functional block of the conventional configuration.

As described above, the display processing section 25 performs the DMA transfer for which a necessary transfer rate is secured to pre-store the display image data in the DMA buffer section 253 while avoiding the inhibition of the DMA transfer in each functional block provided in the image processing device 20 during the DMA smoothing period and performs the DMA transfer for which a necessary transfer rate is secured to output the valid display image data to the display device 40 during the normal DMA period.

According to the present embodiment, there is provided a data transfer device (the display processing section 25), including: a DMA buffer section (the DMA buffer section 253) including a plurality of storage regions (buffer regions, for example, the buffer regions 253-1 to 253-16) and configured to store data (display image data) acquired by a DMA transfer in the buffer regions in units of the DMA transfers; a buffer control section (the buffer counter control section 255) configured to output a first writing permission signal (a writing permission signal) for permitting the DMA transfer for acquiring the display image data on the basis of presence or absence of a free buffer region which is one of the buffer regions where the display image data is not stored; a smoothing buffer control section (the DMA smoothing control section 256 and the DMA smoothing counter control section 257) configured to output a second writing permission signal (a smoothing writing permission signal) for permitting the DMA transfer for acquiring the display image data within a predetermined period (a DMA smoothing period); a buffer writing control section (the DMA interface section 251 and the buffer writing control section 252) configured to execute the DMA transfer according to the writing permission signal and the DMA transfer according to the smoothing writing permission signal, and cause the display image data acquired by each of the DMA transfer to be sequentially stored in the free buffer region; and a buffer reading control section (the buffer reading control section 254) configured to sequentially read the display image data stored in the buffer region for each buffer region, wherein a predetermined amount of display image data (for one frame) sequentially acquired by a plurality of DMA transfers (valid display image data obtained by performing a predetermined arithmetic process on the display image data) is output as a transfer unit.

Also, according to the present embodiment, the display processing section 25 in which the DMA interface section 251 and the buffer writing control section 252 perform switching between the execution of the DMA transfer according to the writing permission signal and the execution of the DMA transfer according to the smoothing writing permission signal at predetermined timings for each transfer unit is configured.

Also, according to the present embodiment, the display processing section 25 in which the DMA interface section 251 and the buffer writing control section 252 is configured to execute the DMA transfer according to the smoothing writing permission signal until the image display data is stored in all of the buffer regions provided in the DMA buffer section 253 from a reference timing (a timing of a start of a vertical synchronization signal VD) in each transfer unit, and the DMA interface section 251 and the buffer writing control section 252 is configured to acquire the image display data to be stored in the free buffer region where reading of the image display data has been completed by the buffer reading control section 254 by the DMA transfer in accordance with the writing permission signal after the display image data is stored in all of the buffer regions provided in the DMA buffer section 253 is configured.

Also, according to the present embodiment, the display processing section 25 in which the DMA interface section 251 and the buffer writing control section 252 start the DMA transfer according to the smoothing writing permission signal from a timing at which a predetermined time has elapsed from the timing of the start of the vertical synchronization signal VD (for example, a timing at which a period of a predetermined number of horizontal synchronization signals HD has elapsed) is configured.

Also, according to the present embodiment, the display processing section 25 in which the DMA smoothing control section 256 and the DMA smoothing counter control section 257 include a counter configured to count the number of DMA transfers to be successively performed, the counter is initialized before the first DMA transfer for each transfer unit (a counter value=0), increments a count value (a counter value) at each predetermined time interval (every time a trigger pulse signal is input), and decrements the counter value every time the DMA interface section 251 and the buffer writing control section 252 executes the DMA transfer, and the DMA smoothing control section 256 and the DMA smoothing counter control section 257 is configured to output the smoothing writing permission signal on the basis of the counter value of the counter is configured.

Also, according to the present embodiment, the display processing section 25 in which the transfer unit is one frame in an image (a display image), the display image data is image data for display, and the display processing section 25 is configured to output the image data for display acquired according to the DMA transfer to a display device (the display device 40) is configured.

According to the present embodiment, there is provided an image processing device (the image processing device 20), including: the display processing section 25 which includes the DMA buffer section 253 including a plurality of buffer regions (for example, the buffer regions 253-1 to 253-16) and configured to store display image data acquired by a DMA transfer in the buffer regions in units of the DMA transfers; the buffer counter control section 255 configured to output a writing permission signal for permitting the DMA transfer for acquiring the display image data on the basis of presence or absence of a free buffer region which is one of the buffer regions where the display image data is not stored; the DMA smoothing control section 256 and the DMA smoothing counter control section 257 configured to output a smoothing writing permission signal for permitting the DMA transfer for acquiring the display image data within a predetermined period (a DMA smoothing period); the DMA interface section 251 and the buffer writing control section 252 configured to execute the DMA transfer according to the writing permission signal and the DMA transfer according to the smoothing writing permission signal, and cause the display image data acquired by each of the DMA transfer to be sequentially stored in the free buffer region; and the buffer reading control section 254 configured to sequentially read the display image data stored in the buffer region for each buffer region, wherein a predetermined amount of display image data (for one frame) sequentially acquired by a plurality of DMA transfers is output as a transfer unit.

Also, according to the present embodiment, the image processing device 20 in which the transfer unit is one frame in an image (a display image), the display image data is image data for display, and the display processing section 25 is provided as a display processing section configured to output the image data for display acquired according to the DMA transfer to a display device (the display device 40) is configured.

Also, according to the present embodiment, there is provided an imaging device (the imaging device 1), including: an image processing device (the image processing device 20) which includes the display processing section 25 including the DMA buffer section 253 including a plurality of buffer regions (for example, the buffer regions 253-1 to 253-16) and configured to store display image data acquired by a DMA transfer in the buffer regions in units of the DMA transfers; the buffer counter control section 255 configured to output a writing permission signal for permitting the DMA transfer for acquiring the display image data on the basis of presence or absence of a free buffer region which is one of the buffer regions where the display image data is not stored; the DMA smoothing control section 256 and the DMA smoothing counter control section 257 configured to output a smoothing writing permission signal for permitting the DMA transfer for acquiring the display image data within a predetermined period (a DMA smoothing period); the DMA interface section 251 and the buffer writing control section 252 configured to execute the DMA transfer according to the writing permission signal and the DMA transfer according to the smoothing writing permission signal, and cause the display image data acquired by each of the DMA transfer to be sequentially stored in the free buffer region; and the buffer reading control section 254 configured to sequentially read the display image data stored in the buffer region for each buffer region, wherein a predetermined amount of display image data (for one frame) sequentially acquired by a plurality of DMA transfers is output as a transfer unit.

Also, according to the present embodiment, the imaging device 1 in which the transfer unit is one frame in an image (a display image), the display image data is image data for display, and the display processing section 25 is provided as a display processing section configured to output the image data for display acquired according to the DMA transfer to a display device (the display device 40) is configured.

As described above, according to the embodiment of the present invention, the data transfer device includes the DMA smoothing control section and the DMA smoothing counter control section and a necessary transfer rate is secured and data to be transferred is pre-stored in the DMA buffer section according to the DMA transfer at a predetermined interval during the DMA smoothing period. Thereby, in the data transfer device according to the embodiment of the present invention, the DMA transfer in another functional block connected to the DRAM bus is not inhibited by the DMA transfer of the data transfer device. The data transfer device according to the embodiment of the present invention stores new data to be subsequently transferred in a free storage capacity of the DMA buffer section by performing the DMA transfer while reading and outputting data stored in the DMA buffer section during the normal DMA period. Thereby, the data transfer device according to the embodiment of the present invention can secure a DMA transfer at a desired transfer rate and transfer data at the necessary transfer rate.

Also, in the embodiment of the present invention, a case in which a timing at which the display processing section 25 performs switching between the DMA smoothing period and the normal DMA period is set to a timing at which display image data to be output to the display device 40 is acquired from the DRAM 30 according to the DMA transfer and completely stored in all buffer regions provided in the DMA buffer section 253 has been described. However, the timing of switching between the DMA smoothing period and the normal DMA period is not limited to the timing shown in the embodiment of the present invention and may be any timing until the output of the valid display image data of a first line displayed in the valid display region 41 of the display device 40 is started after the display image data is stored in all the buffer regions provided in the DMA buffer section 253. For example, in the timing chart of one example of the operation shown in FIG. 4, a configuration in which switching between the DMA smoothing period and the normal DMA period is performed at a timing when the valid display region identification signal initially becomes the "H" level to indicate the range of the valid display region 41, a timing of a predetermined time before the timing (for example, a timing of a start of a second last horizontal synchronization signal HD in the range of the valid display region 41), or the like may be adopted.

Also, in the embodiment of the present invention, a case in which a timing at which the display processing section 25 is initialized is a timing of a start of the vertical synchronization signal VD for starting the display of the display image of each frame in the display device 40 has been described. However, the timing at which the display processing section 25 is initialized is not limited to the timing shown in the embodiment of the present invention. For example, the timing of the start of the vertical synchronization signal VD may also be the timing at which the DMA transfer is started for another functional block included in the image processing device 20. Thus, a timing at which the display processing section 25 is initialized may be a timing at which a predetermined time has elapsed from the start of the vertical synchronization signal VD. Here, the predetermined time may be set by, for example, a control section such as a CPU configured to perform overall control of the imaging device 1 or a control section (not shown) configured to control the entire image processing device 20.

Also, in the embodiment of the present invention, a case in which the interval of the DMA request to be available during the DMA smoothing period is fixed has been described. That is, a case in which the time interval preset in the DMA smoothing control section 256 is a fixed time has been described. However, a configuration in which the interval of the DMA request (the setting of the time interval) during the DMA smoothing period changes during the DMA smoothing period may be adopted. In this case, for example, a configuration in which a free storage capacity of the DMA buffer section 253 is checked at a previously predetermined timing in the range of the valid display region 41 (for example, a timing of a start of a second last horizontal synchronization signal HD) and the setting of the time interval is changed during the DMA smoothing period on the basis of a checking result may be adopted. Also, instead of a configuration in which the setting of the time interval is changed during the DMA smoothing period, for example, a configuration in which switching to the normal DMA period is performed after the DMA smoothing period is completed on the basis of the free storage capacity of the DMA buffer section 253 checked at the timing of the start of the second last horizontal synchronization signal HD may be adopted. In this case, a subsequent DMA request for previously storing the display image data in all the buffer regions provided in the DMA buffer section 253 is output on the basis of the writing permission signal.

Also, in the embodiment of the present invention, a case in which the data transfer device is a display processing section configured to output valid display image data to be displayed on the display device included in the imaging device has been described. However, data transfer devices for implementing various functions in addition to the display processing section shown in the embodiment of the present invention are conceived as a data transfer device to which a configuration and an operation based on a concept of the data transfer device of the present invention can be similarly applied. For example, as in the display processing section shown in the embodiment of the present invention, in the case of a configuration in which the image sensor provided in the imaging device divides pixel signals for one frame into two regions on the left and right and outputs the divided pixel signals in the functional block provided in the image processing device mounted on the imaging device, an imaging processing section configured to perform a correction process in accordance with a timing of pixel signals output from the image sensor is conceived. In such an imaging processing section, after image data obtained by performing a correction process on the pixel signal of the left region is stored in a DRAM, a correction process is performed in accordance with a timing at which the image sensor outputs the pixel signal of the right region while acquiring the image data corresponding to the left region from the DRAM according to a DMA transfer when the correction process is performed on the pixel signal of the right region. For example, in a functional block provided in an image processing device mounted on an imaging device such as a moving-image camera, an image processing section configured to perform image processing in accordance with a timing at which a display image is displayed on the display device and a recording processing section configured to cause a moving-image data subjected to a recording process to be recorded in the recording medium in accordance with a timing at which a display image is displayed on the display device are considered. As described above, the data transfer device to which the configuration and the operation based on the concept of the data transfer device of the present invention can be similarly applied is not limited to the display processing section shown in the embodiment of the present invention. Also, the data transfer device to which the configuration and the operation based on the concept of the data transfer device of the present invention can similarly be applied is not limited to the imaging device described in the embodiment of the present invention and the image processing device or the data transfer device mounted on the imaging device. That is, a configuration and an operation based on the concept of the present invention can be similarly applied to a data transfer device configured to input/output (transfer) data subjected to the DMA transfer in accordance with a limit of a predetermined timing in a data transfer device of any configuration and an effect similar to that of the present invention can be obtained.

While preferred embodiments of the present invention have been described and shown above, the present invention is not limited to the embodiments and modified examples thereof. Within a range not departing from the gist or spirit of the present invention, additions, omissions, substitutions, and other modifications to the configuration can be made.

Also, the present invention is not to be considered as being limited by the foregoing description, and is limited only by the scope of the appended claims.

What is claimed is:

1. A data transfer device, comprising:
a direct memory access (DMA) buffer section including a plurality of storage regions and configured to store data acquired by a DMA transfer in the storage regions in units of the DMA transfers;
a buffer control section configured to output a first writing permission signal for permitting the DMA transfer for acquiring the data on the basis of presence or absence of a free storage region which is one of the storage regions where the data is not stored;
a smoothing buffer control section configured to output a second writing permission signal for permitting the DMA transfer for acquiring the data within a predetermined period;
a buffer writing control section configured to execute the DMA transfer according to the first writing permission signal and the DMA transfer according to the second writing permission signal, and cause the data acquired by each of the DMA transfer to be sequentially stored in the free storage region; and
a buffer reading control section configured to sequentially read the data stored in the storage region for each storage region,
wherein a predetermined amount of data sequentially acquired by a plurality of DMA transfers is output as a transfer unit,
wherein the smoothing buffer control section includes a counter configured to count the number of DMA transfers to be successively performed,
wherein the counter is initialized before the first DMA transfer for each transfer unit, increments a count value at each predetermined time interval, and decrements the count value every time the buffer writing control section executes the DMA transfer, and
wherein the smoothing buffer control section is configured to output the second writing permission signal on the basis of the count value of the counter.

2. The data transfer device according to claim 1,
wherein the buffer writing control section performs switching between the execution of the DMA transfer according to the first writing permission signal and the execution of the DMA transfer according to the second writing permission signal at predetermined timings for each transfer unit.

3. The data transfer device according to claim 2,
wherein the buffer writing control section is configured to execute the DMA transfer according to the second writing permission signal until the data is stored in all of the storage regions provided in the DMA buffer section from a reference timing in each transfer unit, and
wherein the buffer writing control section is configured to acquire the data to be stored in the free storage region where reading of the data has been completed by the buffer reading control section by the DMA transfer in accordance with the first writing permission signal after the data is stored in all of the storage regions provided in the DMA buffer section.

4. The data transfer device according to claim 3,
wherein the buffer writing control section starts the DMA transfer according to the second writing permission signal from a timing at which a predetermined time has elapsed from the reference timing.

5. The data transfer device according to claim 1,
wherein the transfer unit is one frame in an image,
wherein the data is image data for display, and
wherein the data transfer device is configured to output the image data for display acquired according to the DMA transfer to a display device.

6. An image processing device, comprising:
a data transfer device which includes
a DMA buffer section including a plurality of storage regions and configured to store data acquired by a DMA transfer in the storage regions in units of the DMA transfers;
a buffer control section configured to output a first writing permission signal for permitting the DMA transfer for acquiring the data on the basis of presence or absence of a free storage region which is one of the storage regions where the data is not stored;
a smoothing buffer control section configured to output a second writing permission signal for permitting the DMA transfer for acquiring the data within a predetermined period;
a buffer writing control section configured to execute the DMA transfer according to the first writing permission signal and the DMA transfer according to the second writing permission signal, and cause the data acquired by each of the DMA transfer to be sequentially stored in the free storage region; and
a buffer reading control section configured to sequentially read the data stored in the storage region for each storage region,
wherein a predetermined amount of data sequentially acquired by a plurality of DMA transfers is output as a transfer unit,
wherein the smoothing buffer control section includes a counter configured to count the number of DMA transfers to be successively performed,
wherein the counter is initialized before the first DMA transfer for each transfer unit, increments a count value at each predetermined time interval, and decrements the count value every time the buffer writing control section executes the DMA transfer, and
wherein the smoothing buffer control section is configured to output the second writing permission signal on the basis of the count value of the counter.

7. The image processing device according to claim 6,
wherein the transfer unit is one frame in an image,
wherein the data is image data for display, and
wherein the data transfer device is provided as a display processing section configured to output the image data for display acquired according to the DMA transfer to a display device.

8. An imaging device, comprising:
an image processing device which includes
a data transfer device including
- a DMA buffer section including a plurality of storage regions and configured to store data acquired by a DMA transfer in the storage regions in units of the DMA transfers;
- a buffer control section configured to output a first writing permission signal for permitting the DMA transfer for acquiring the data on the basis of presence or absence of a free storage region which is one of the storage regions where the data is not stored;
- a smoothing buffer control section configured to output a second writing permission signal for permitting the DMA transfer for acquiring the data within a predetermined period;
- a buffer writing control section configured to execute the DMA transfer according to the first writing permission signal and the DMA transfer according to the second writing permission signal, and cause the data acquired by each of the DMA transfer to be sequentially stored in the free storage region; and
- a buffer reading control section configured to sequentially read the data stored in the storage region for each storage region, wherein a predetermined amount of data sequentially acquired by a plurality of DMA transfers is output as a transfer unit, wherein the smoothing buffer control section includes a counter configured to count the number of DMA transfers to be successively performed, wherein the counter is initialized before the first DMA transfer for each transfer unit, increments a count value at each predetermined time interval, and decrements the count value every time the buffer writing control section executes the DMA transfer, and wherein the smoothing buffer control section is configured to output the second writing permission signal on the basis of the count value of the counter.

9. The imaging device according to claim 8,
wherein the transfer unit is one frame in an image,
wherein the data is image data for display, and
wherein the data transfer device is provided as a display processing section configured to output the image data for display acquired according to the DMA transfer to a display device.

* * * * *